(12) United States Patent  
    Stratigopoulos et al.

(10) Patent No.: US 12,701,000 B2  
(45) Date of Patent: Aug. 4, 2026

(54) METHOD FOR SECURING TELECOMMUNICATION TRANSCEIVER INTEGRATED CIRCUIT DESIGNS AGAINST PIRACY, COUNTERFEITING AND UNAUTHORIZED USE

(71) Applicants: Sorbonne Université, Paris (FR); Centre National de la Recherche Scientifique, Paris (FR)

(72) Inventors: Charalampos Stratigopoulos, Paris (FR); Alàn Rodrigo Diaz Rizo, Paris (FR); Hassan Aboushady, Paris (FR)

(73) Assignees: SORBONNE UNIVERSITÉ, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 27 days.

(21) Appl. No.: 18/844,385

(22) PCT Filed: Mar. 10, 2022

(86) PCT No.: PCT/IB2022/000135  
§ 371 (c)(1),  
(2) Date: Sep. 5, 2024

(87) PCT Pub. No.: WO2023/170439  
PCT Pub. Date: Sep. 14, 2023

(65) Prior Publication Data  
US 2025/0184133 A1     Jun. 5, 2025

(51) Int. Cl.  
*H04L 9/08*        (2006.01)

(52) U.S. Cl.  
CPC .................................... *H04L 9/088* (2013.01)

(58) Field of Classification Search  
None  
See application file for complete search history.

(56) References Cited

U.S. PATENT DOCUMENTS

2003/0081769 A1*   5/2003   Hamilton ........... H04N 1/32144  
                                        380/28  
2005/0108507 A1*   5/2005   Chheda ............... G06F 9/30167  
                                     712/E9.035

(Continued)

FOREIGN PATENT DOCUMENTS

WO       20230170439 A1     9/2023

OTHER PUBLICATIONS

Foreign Communication from a Related Counterpart Application, International Search Report and Written Opinion dated Oct. 28, 2022, International Application No. PCT/IB2022/000135 filed on Mar. 10, 2022.

(Continued)

*Primary Examiner* — William J. Goodchild  
(74) *Attorney, Agent, or Firm* — Conley Rose, P.C.; Michael W. Piper; Andrew M. Metrailer

(57)           ABSTRACT

A method is proposed for generating communication frames to be transmitted by a telecommunication transmitter. Such method comprises:

obtaining (S200) a first cryptographic key and a second cryptographic key;

encrypting (S210), using the first cryptographic key, an initial sequence of data to be transmitted through the communication frames, the encrypting delivering a first sequence of data;

decrypting (S220), using the second cryptographic key, the first sequence of data, the decrypting delivering a second sequence of data; and generating (S230) the communication frames based on the second sequence of data, the encrypting and the decrypting being configured such that the second sequence of data comprises the initial sequence of data when a predetermined relationship holds between the first cryptographic key and the second cryptographic key, (Continued)

thus allowing protection of the telecommunication transmitter against piracy, counterfeiting and unauthorized use.

10 Claims, 2 Drawing Sheets

(56)                    References Cited

U.S. PATENT DOCUMENTS

| | | | |
|---|---|---|---|
| 2005/0162338 A1* | 7/2005 | Ikeda ..................... | G09G 5/006 |
| | | | 345/2.1 |
| 2006/0093148 A1* | 5/2006 | Ko ...................... | H04W 12/033 |
| | | | 380/270 |
| 2010/0284539 A1 | 11/2010 | Roy et al. | |
| 2014/0340112 A1 | 11/2014 | Tehranipoor et al. | |
| 2020/0244434 A1 | 7/2020 | Pedersen | |
| 2022/0078138 A1* | 3/2022 | Zhou ..................... | H04L 9/0822 |

OTHER PUBLICATIONS

Rao et al., "Performance and security analysis of parameter obfuscated analog circuits," IEEE Trans. Very Large Scale Integr. (VLSI) Syst., 25 vol. 29, No. 12, pp. 2013-2026, Dec. 2021.
Leonhard, et al. "Mixlock: Securing 30 mixed-signal circuits via logic locking," in Proc. Design, Automat. Test Eur. Conf. Exhib. (Date), Mar. 2019, p. 84-89.
Elshamy, A., et al., "Locking by untuning: A lock-less approach for analog and mixed-signal IC security," IEEE Trans. Very Large Scale Integr. (VLSI) Syst., vol. 29, No. 12, pp. 2130-2142, Dec. 2021.

* cited by examiner

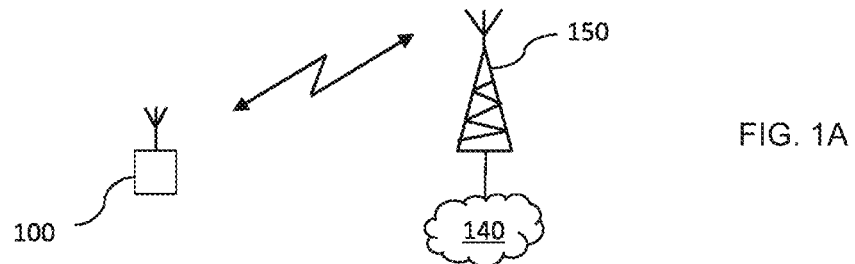
FIG. 1A
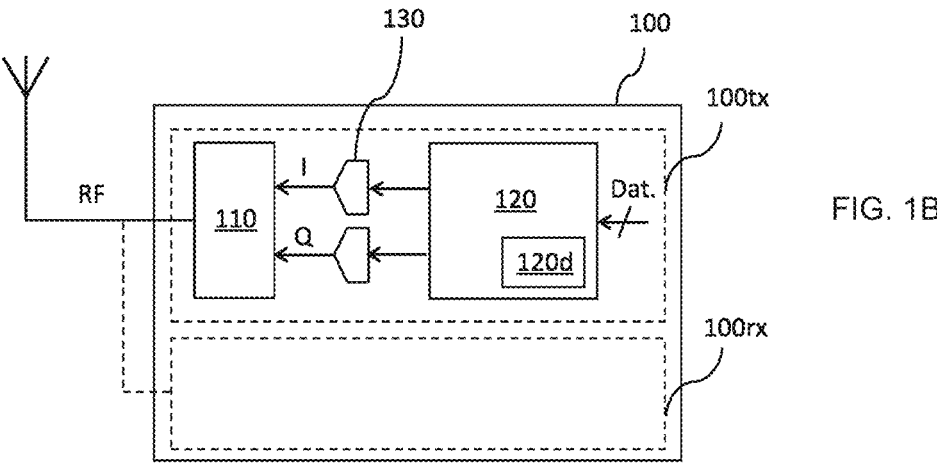
FIG. 1B
FIG. 1C
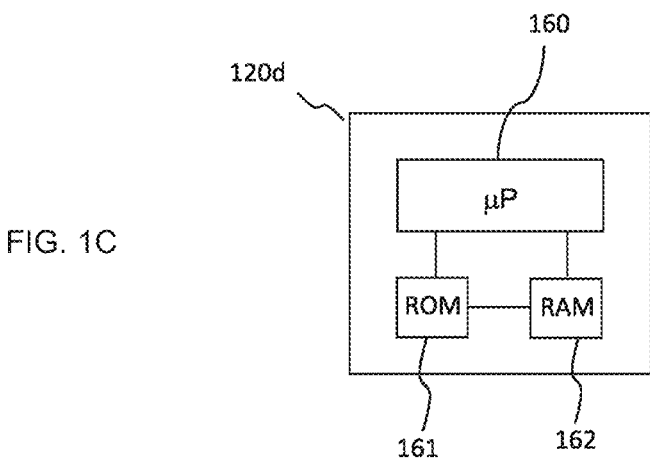

METHOD FOR SECURING TELECOMMUNICATION TRANSCEIVER INTEGRATED CIRCUIT DESIGNS AGAINST PIRACY, COUNTERFEITING AND UNAUTHORIZED USE

CROSS-REFERENCE TO RELATED APPLICATIONS

The present application is a filing under 35 U.S.C. 371 as the National Stage of International Application No. PCT/IB2022/000135, filed Mar. 10, 2022, entitled "METHOD FOR SECURING TELECOMMUNICATION TRANSCEIVER INTEGRATED CIRCUIT DESIGNS AGAINST PIRACY, COUNTERFEITING AND UNAUTHORIZED USE," which is incorporated herein by reference in their entirety for all purposes.

1. FIELD OF THE DISCLOSURE

The field of the disclosure is that of the telecommunications.

More specifically, the disclosure relates to a method for generating communication frames (e.g. data frames, control frames, management frames, etc.) to be transmitted by a telecommunication transmitter.

The disclosure can be of interest in any field related to telecommunications like for instance in the field of mobile telephony (e.g. 4G or 5G networks as defined by the 3GPP (for "3rd Generation Partnership Project")), of Wireless Local Area Network (WLAN) (e.g. using WiFi), of digital broadcasting systems (e.g. DVB-T (for "Digital Video Broadcasting-Terrestrial"), ISDB-T (for "Integrated Services Digital Broadcasting-Terrestrial"), DAB (for "Digital Audio Broadcasting")), of high-speed wireless internet access (e.g. WiMAX), of point-to-point radio links, of Ethernet (e.g. following the IEEE 802.3 standard), of satellite telecommunication, etc.

2. TECHNOLOGICAL BACKGROUND

The high level of integration achievable in Integrated Circuits (ICs) makes possible to embed most of the required functions, such as the Physical (PHY) Layer and the radiofrequency (RF) front-end, for a telecommunication transmitter in a single IC.

However, due to the globalization of design and manufacturing tasks and their outsourcing to potentially untrusted third parties, as well as due to the increased capabilities for performing reverse-engineering of ICs, piracy of entire ICs or of functional blocks (often called "IP" blocks) that are part of an IC arises as a major hardware security and trust threat.

Piracy of IPs/ICs includes cloning, overbuilding, remarking, and recycling. Cloning refers to illegally copying a design and reusing it without the consent or knowledge of the design owner. It can be performed by rogue agents in IC integration houses and foundries or by an end-user through reverse-engineering of a legally purchased chip. Overbuilding can be performed by a foundry that holds the blueprint of the design and refers to producing and selling chips beyond the number agreed on in the contract with the chip design owner. Remarking can be performed by a test facility and refers to relabeling failing chips as functional and refers to relabeling failing chips as functional or binning lower-quality chips with degraded performance as perfectly functional. Recycling refers to scrapping a likely aged chip from a used board and re-entering it into the market as a "fresh" unused chip. Piracy leads to counterfeit chips that are a serious threat for design houses (e.g., loss of knowhow, sales, and brand name, costs to mitigate the risk), governments (e.g., national security threat if counterfeit chips are used in critical infrastructure or defense), and the society as a whole (e.g., counterfeits are likely to be of lower quality and have shorter lifespan).

IP/IC locking has been considered as a defense or countermeasure against piracy protecting an IP/IC against potential attackers located anywhere in the supply chain, as well as against malicious end-users and recycling facilities. IP/IC locking is performed by the design owner and consists in embedding a lock mechanism inside the IP/IC during the design phase. The lock mechanism is a circuit that is controlled by a key which is typically in the form of a digital bit-string.

More particularly, for telecommunication transmitters, and more generally for telecommunication transceivers, analog and mixed-signal (AMS) ICs are considered. For instance, existing techniques for locking AMS ICs include biasing locking, MixLock, and calibration locking.

Biasing locking aims at controlling the bias generation with the key. Several embodiments of biasing locking exist, including obfuscating the geometry of a bias transistor, designing key-controlled current mirrors, and replacing the biasing circuit with an alternative key-controlled bias generator. An example of such techniques can be found in the article by V. Rao and I. Savidis, "*Performance and security analysis of parameter obfuscated analog circuits,*" IEEE Trans. Very Large Scale Integr. (VLSI) Syst., vol. 29, no. 12, pp. 2013-2026, December 2021. However, biasing locking may result in imprecise or unstable biasing and, besides, recently counter-attacks were proposed based on Satisfiability Modulo Theory (SMT) and optimization that break this type of defence.

MixLock, as discussed in the article by J. Leonhard et al. "*MixLock: Securing mixed-signal circuits via logic locking,*" in Proc. Design, Automat. Test Eur. Conf. Exhib. (DATE), March 2019, p. 84-89, leverages locking techniques in the digital domain (a.k.a logic locking) to lock an AMS IC via locking its digital section. However, it incurs a justifiable yet non-negligible area and power overhead. Besides, most logic locking techniques soon after their appearance were broken by a counter-attack aiming at lock removal or fast key extraction.

Calibration locking makes the compensation of process variations or adaptation to different operation modes keydependent. Techniques in this category include e.g. logic locking of the digital processor in the feedback calibration loop, treating digital programmability as a natural secret key, and making the calibration range key-dependent. An example of such technique can be found in the article by M. Elshamy, A. Sayed, M.-M. Lousrat, H. Aboushady, and H.-G. Stratigopoulos, "*Locking by untuning: A lock-less approach for analog and mixed-signal IC security,*" IEEE Trans. Very Large Scale Integr. (VLSI) Syst., vol. 29, no. 12, pp. 2130-2142, December 2021. However, to be secure, calibration locking requires that the calibration algorithm is complex enough to be devised or re-designed in hardware by the attacker, an assumption that is not always met.

There is thus a need for an efficient anti-piracy and anti-counterfeiting technique for ICs that applies in particular to a telecommunication transmitter and in general to a telecommunication transceiver.

3. SUMMARY

A particular aspect of the present disclosure relates to a method for generating at least one communication frame to be transmitted by a telecommunication transmitter. According to such method, an electronic device executes:

obtaining a first cryptographic key and a second cryptographic key;

encrypting, using the first cryptographic key, an initial sequence of data to be transmitted through the at least one communication frame, the encrypting delivering a first sequence of data;

decrypting, using the second cryptographic key, the first sequence of data, the decrypting delivering a second sequence of data; and generating the at least one communication frame based on the second sequence of data.

The encrypting and the decrypting are configured such that the second sequence of data comprises the initial sequence of data when a predetermined relationship holds between the first cryptographic key and the second cryptographic key.

Thus, the present disclosure proposes a new and inventive anti-piracy and anti-counterfeiting technique for an IC implementing functionalities of a telecommunication transmitter.

More particularly, the joint effect of encryption and decryption using the first and second cryptographic keys generates the expected initial data only when a predetermined relationship holds between the first and second cryptographic keys. Thus, when the IC is provided e.g. to a customer with only one of the first and second cryptographic keys populated in the IC, the customer can have the transmitter to work properly only when the expected other one of the first and second cryptographic keys is provided to the IC. This prevents from unexpected IC cloning, overbuilding, remarking, and recycling. In addition, if the cryptographic key enabling proper functionality is unique to the IC, then this unique cryptographic key can be used as an electronic fingerprint along the lifecycle of the IC against unauthorized use.

In some embodiments, the obtaining comprises: reading at least one of the first cryptographic key and the second cryptographic key from a memory of the electronic device.

It can be e.g. a Tamper-Proof Memory (TPM) or a memory in a secure area of the electronic device.

In some embodiments, the other one of the first cryptographic key and second cryptographic key is a hardwired key.

Thus, the corresponding hardwired cryptographic key cannot be easily identified in the digital netlist of the IC.

In some embodiments, the initial sequence of data comprises all or part of a predetermined preamble sequence of the at least one communication frame.

The preamble sequence can be e.g. a preamble sequence of a known wireless standard the telecommunication transmitter is expected to comply with. Having the step of encryption that applies to a predetermined sequence of data, and not to random input data, allows preventing having access to the input of the encryption bloc. This allows preventing attempts to determine the cryptographic keys by using particular input data patterns to be encrypted/decrypted.

In some embodiments, the predetermined relationship corresponds to having the first cryptographic key and the second cryptographic key that are a same cryptographic key.

In some embodiments:

the encrypting implements an XOR logical function between binary elements of the initial sequence of data and of the first cryptographic key; and the decrypting implements an XOR logical function between binary elements of the first sequence of data and of the second cryptographic key.

Thus, the implementation is efficient in terms of number of logical gates and electrical power consumption.

In some embodiments, the decrypting the first sequence of data comprises: determining a decryption sequence as an output of a nonlinear function taking as arguments the second cryptographic key and the second sequence of data. The decrypting the first sequence of data uses the decryption sequence.

As the second sequence of data can potentially be accessed as an output of the device, the use of such nonlinear function prevents from the possibility to make a Known-Plaintext Attack (KPA) by acting on the cryptographic key provided (e.g. downloaded) to the IC.

In some embodiments, the nonlinear function implements:

an XOR logical function between binary elements of the second cryptographic key and of the second sequence of data, delivering an intermediate sequence; and a nonlinear operation on the intermediate sequence, delivering the decryption sequence.

Such nonlinear operation can be e.g. a circular permutation, a random shuffling or a byte substitution of the binary elements of intermediate sequence.

In some embodiments:

the encrypting implements an XOR logical function between binary elements of the initial sequence of data and of the first cryptographic key; and the decrypting implements an XOR logical function between binary elements of the first sequence of data and the decryption sequence.

Thus, the implementation is efficient in terms of number of logical gates and electrical power consumption.

In some embodiments, the predetermined relationship corresponds to having the first cryptographic key based on an output of the nonlinear function when taking as arguments the second cryptographic key and the initial sequence of data.

Another aspect of the present disclosure relates to a computer program product comprising program code instructions for implementing the above-mentioned method for generating at least one communication frame (in any of the different embodiments discussed above), when said program is executed on a computer or a processor.

Another aspect of the present disclosure relates to an electronic device configured for implementing all or part of the steps of the above-mentioned method for generating at least one communication frame (in any of the different embodiments discussed above). Thus, the features and advantages of this device are the same as those of the corresponding steps of said method. Therefore, they are not detailed any further.

Another aspect of the present disclosure relates to a telecommunication transmitter that comprises an electronic device according to any of the different embodiments discussed above.

4. LIST OF FIGURES

Other features and advantages of embodiments shall appear from the following description, given by way of indicative and non-exhaustive examples and from the appended drawings, of which:

FIG. 1A illustrates a terminal equipment in communication with a base station of a cellular network according to one embodiment of the present disclosure;

FIG. 1B illustrates an example of the functional blocks that can be implemented in the telecommunication transceiver of the terminal equipment of FIG. 1A;

FIG. 1C illustrates an example of the structural blocks that can be implemented in the device of FIG. 1B;

5. DETAILED DESCRIPTION

Figure 2A:
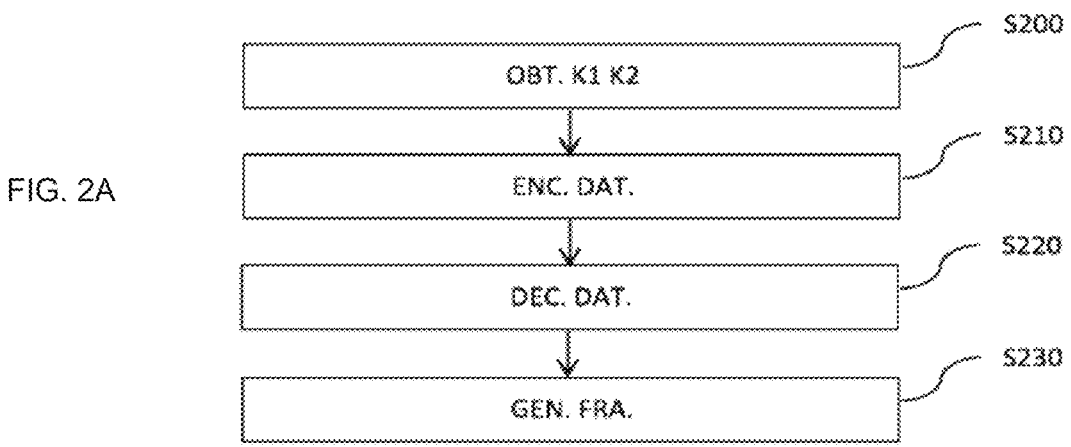
FIG. 2A illustrates the steps of a method for generating communication frames by the device of FIG. 1B according to one embodiment of the present disclosure.

In all of the Figures of the present document, the same numerical reference signs designate similar elements and steps.

Referring now to FIG. 1A and FIG. 1B, we describe a terminal equipment 100 according to one embodiment of the present disclosure.

The terminal equipment 100 is connected to a base station 150 which is in turn connected to the core network 140 of a cellular network. For this to be possible, the terminal equipment 100 comprises a telecommunication transceiver comprising a receiver 100rx and a transmitter 100tx.

More particularly, the transmitter 100tx comprises a generation module 120 that generates the I and Q modulating waveforms based on the data bits. Depending on the considered telecommunication standard, the generation module 120 implements known functionalities like symbol mapping, frame generation, pulse shaping filtering and/or Fourier transform, e.g. for Orthogonal Frequency Division Multiplex (OFDM) waveforms, etc. However, the generation module 120 also comprises an electronic device 120d that implements the method for generating communication frames according to any of the embodiments described below in relation with FIGS. 2A, 2B and 2C.

Back to FIG. 1B, the digital samples of the I and Q modulating waveforms delivered by the generation module 120 are converted in the analog domain by the digital-to-analog converters (DAC) 130, delivering corresponding analog I and Q signals.

The analog I and Q signals are further processed by the RF front-end 110 that generates the modulated RF signal to be transmitted based on the analog I and Q signals. Depending on the chosen architecture (e.g. direct conversion, super-heterodyne, highly-digitized, etc.), the RF front-end 110 implements known functionalities like low-pass filtering of the analog I and Q signals delivered by the DAC 130, frequency upconversion, amplification, etc.

In the present embodiment, the terminal equipment 100 is a smartphone and the cellular network is a cellular network according to one of the 3rd Generation Partnership Project, 3GPP, standards (e.g. 2G, 3G, 4G, 5G and beyond). However, in other embodiments, instead of the terminal equipment 100 there may be a base station, a wireless modem, an access point, a router, a personal computer, a tablet, an Internet-of-Thing device, or any other end equipment that can be equipped with a telecommunication transceiver for wireless or wired connectivity. Such connectivity can be based on cellular protocols, but also on any telecommunication protocol like e.g. Bluetooth, WiFi, ZigBee, IEEE 802.3, etc.

Back to FIG. 1C, in order to be able to implement the method for generating communication frames according to the present disclosure (according to any of the embodiments discussed below in relation with FIGS. 2A, 2B and 2C), in some embodiments the device 120d comprises:
- a non-volatile memory 161 (e.g. a read-only memory (ROM), a hard disk, a flash memory, etc.);
- a volatile memory 162 (e.g. a random-access memory or RAM) and a processor 160.

The non-volatile memory 161 is a non-transitory computer-readable carrier medium. It stores executable program code instructions, which are executed by the processor 160 in order to enable implementation of some steps of the method for generating communication frames in the various embodiment discussed below in relation with FIGS. 2A, 2B and 2C.

Upon initialization, the aforementioned program code instructions are transferred from the non-volatile memory 161 to the volatile memory 162 so as to be executed by the processor 160. The volatile memory 162 likewise includes registers for storing the variables and parameters required for this execution.

The steps of the method for generating communication frames may be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but it may also be implemented in hardware form or any form combining a hardware portion and a software portion.

In some embodiments, the device 120d also comprises a Tamper-Proof Memory (TPM) or a memory in a secure area in order to safely store the cryptographic keys as discussed below in relation with FIGS. 2A, 2B and 2C.

Referring now to FIG. 2A, we describe the method for generating communication frames by the device 120d. Some steps of the method are further described in relation with FIGS. 2B and 2C.

In a step S200, the device 120d obtains a first cryptographic key K1 and a second cryptographic key K2.

In some embodiments, the first cryptographic key K1 and the second cryptographic key K2 are stored in a TPM or in a memory in a secure area of the device 120d. The first cryptographic key K1 and the second cryptographic key K2 are thus read from the corresponding memory for being used in the steps S210 and S220 as discussed below. For instance, the second cryptographic key K2 has been populated in the considered memory by the design owner of the IC implementing the device 120d. Conversely, the first cryptographic key K1 is populated by the user of the IC (e.g. it is provided to the user by the company that makes and sells the terminal equipment 100). Such approach prevents from piracy of the IC as the IC can work properly only if the correct first cryptographic key K1 is populated by the user of the IC as discussed further below. Furthermore, when using two TPMs for storing the first cryptographic key K1 and the second cryptographic key K2, one cryptographic key can be made unique to the IC based on a unique selection of the other cryptographic key. In this case, one cryptographic key can be made public and can be used for as a fingerprint of the IC for IC authentication purposes along the entire lifetime of the IC.

Alternatively, an on-chip Physical Unclonable Function (PUF) can be implemented in the IC to generate a unique cryptographic key per IC.

In alternative embodiments, one of the first cryptographic key K1 and the second cryptographic key K2 is hardwired in the netlist of the digital part of the device 120d. This indeed allows having the hardwired key to be hidden and not easily identifiable in the netlist. In such embodiments, the other one of the first cryptographic key K1 and the second cryptographic key K2 that is not hardwired is stored in a TPM or in a memory in a secure area of the device 120d. This key can be populated in the considered memory e.g. by the IC design owner. The hardwired key is directly obtained when the corresponding transistors are power supplied. The other key is read from the corresponding memory for being used in the steps S210 and S220 discussed below. These alternative embodiments save the cost of adding a second TPM but result in common hardwired and non-hardwired keys for all chips.

Back to FIG. 2, in a step S210, the device 120d encrypts, using the first cryptographic key K1, an initial sequence of data (e.g. including control or management data (e.g. synchronization data . . . ), payload data, etc.) to be transmitted through one (or more) communication frame. The execution of the encryption delivers a first sequence of data.

Here, by "encryption" we mean the process of transforming an initial information, that can be interpreted directly by an apparatus the initial information is destined to, into an encrypted information that is no more usable by the considered apparatus. Accordingly, the "encryption" within the meaning of the application encompasses as well cyphering, fault injection, encoding, etc. Furthermore, when the initial information takes the form of an initial sequence of data that are complex valued data (e.g. with a real part that corresponds to data for the I path and an imaginary part that corresponds to data for the Q path), the first cryptographic key K1 (and thus the second cryptographic key K2 too) can possibly be considered as complex valued. For instance, the real part K1_I of K1 can be used for encrypting the real part of the initial data for the I path and the imaginary part K1_Q of K1 can be used for encrypting the imaginary part of the initial data for the Q path. Conversely, a complex valued first cryptographic key K1 can be considered for implementing a scrambling of the initial data between the I and Q paths. Thus, the "encryption" according to the present disclosure also encompasses such scrambling.

In a step S220, the device 120d decrypts, using the second cryptographic key K2, the first sequence of data. The execution of the decryption delivers a second sequence of data.

Here, by "decryption" we mean the process of transforming the previously encrypted information so as to retrieve, when the correct cryptographic keys K1 and K2 have been used, the initial information in a form that is usable by the apparatus the initial information was destined to. In other words, the encrypting in step S210 and the decrypting in step S220 are configured such that the second sequence of data comprises the initial sequence of data when a predetermined relationship holds between the first cryptographic key K1 and the second cryptographic key K2.

Thus, when the IC that implements the device 120d e.g. is provided to a customer with only one of the first cryptographic key K1 and of the second cryptographic key K2 populated, e.g. stored in a TPM or hardwired, the customer can make the IC work correctly only when the expected other one of the first cryptographic key K1 and of the second cryptographic key K2 is provided to the IC. This prevents from unexpected IC cloning, overbuilding, remarking, and recycling.

Back to FIG. 2A, in a step S230 the device 120d generates the communication frame(s) (e.g. data frames, control frames, management frames, etc.) based on the second sequence of data.

For instance, such generated communication frame(s) are further processed by the transmitter 100tx to be transmitted, e.g. to the base station 150.

In some embodiments, the initial sequence of data comprises all or part of a predetermined preamble sequence of the frame(s) to be generated. Indeed, having the process of encryption applying to a predetermined sequence of data like a predetermined preamble sequence, and not to random input data, allows preventing having access to the physical input of the encryption module in the IC. Indeed, the predetermined sequence of data can directly be hardwired to the input of the encryption module in the IC. This allows preventing attempts to determine the cryptographic keys K1 and/or K2 by using particular input data patterns to be encrypted/decrypted.

For instance, such predetermined preamble sequence can be a preamble sequence as defined in any communication standards as listed above (e.g. any 3GPP cellular standard, an IEEE 802.11 standard, a Bluetooth standard, Ethernet, etc.).

Figure 2B:
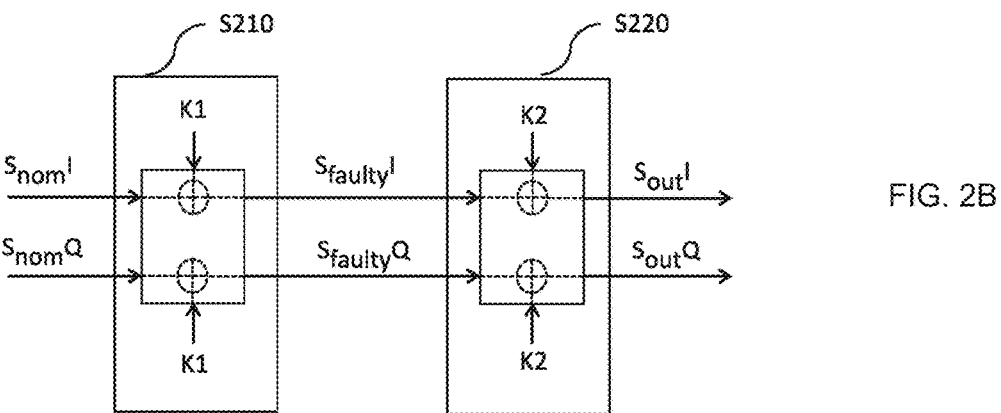
FIG. 2B illustrates the processing executed during the steps of encrypting and decrypting of the method of FIG. 2A according to one embodiment of the present disclosure.
Figure 2C:
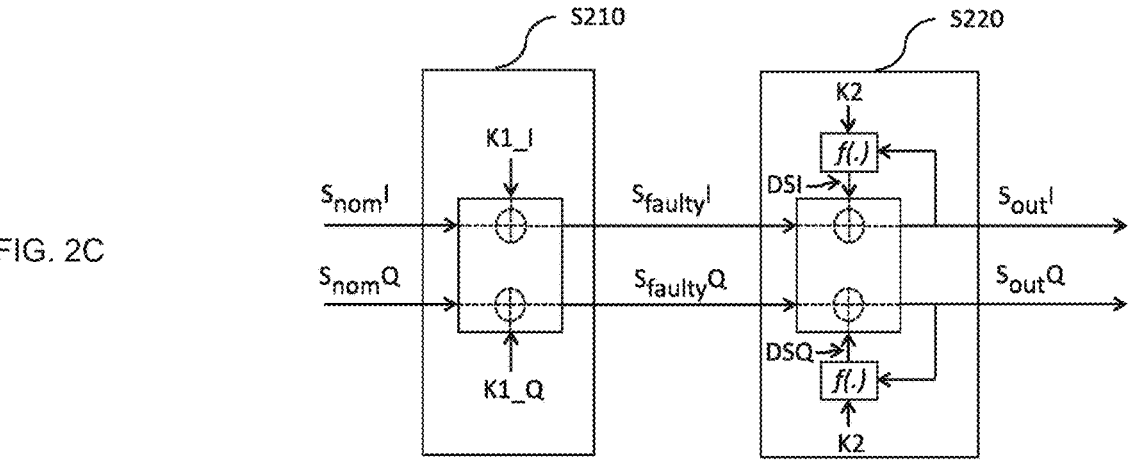
FIG. 2C illustrates the processing executed during the steps of encrypting and decrypting of the method of FIG. 2A according to another embodiment of the present disclosure.

In the FIGS. 2B and 2C, the initial sequence of data can be interpreted as complex valued, with the real part identified as $S_{nom}I$ for the I path, and the imaginary part identified as $S_{nom}Q$ for the Q path. Accordingly, the first sequence of data is identified as $S_{faulty}I$ for the I path and $S_{faulty}Q$ for the Q path. Last, the second sequence of data is identified as $S_{out}I$ for the I path and $S_{out}Q$ for the Q path.

In the embodiment of FIG. 2B, the step S210 comprises the execution of an XOR logical function between binary elements of the initial sequence of data $S_{nom}I$, $S_{nom}Q$ and of the first cryptographic key K1. For the sake of clarity and without loss of generality, it is assumed that the first cryptographic key K1 has a same value for the I and Q paths, i.e. that K1_I=K1_Q=K1, even if, in other embodiments, K1 can have different values for the I and Q paths, i.e. that K1_I #K1_Q. Back to FIG. 2B, we thus get that, for elements of corresponding ranks in the considered sequences, $S_{faulty}I=S_{nom}I\oplus K1$ and $S_{faulty}Q=S_{nom}Q\oplus K1$, where $\oplus$ denotes the XOR logical function.

Similarly, the step S220 comprises the execution of an XOR logical function between binary elements of the first sequence of data and of the second cryptographic key K2, also assumed for the sake of clarity to have a same value for the I and Q paths, i.e. that K2_I=K2_Q=K2. We thus get that $S_{out}I=S_{faulty}I\oplus K2$ and $S_{out}Q=S_{faulty}Q\oplus K2$.

Thus, the implementation is efficient in term of number of logical gates and electrical power consumption as the XOR function is a simple way to inject error during the encryption and to correct the errors during decryption.

In order to establish correct IC functionality, e.g. satisfy $S_{out}I=S_{nom}I$ and $S_{out}Q=S_{nom}Q$, we need to have $S_{nom}I=S_{out}I=(S_{nom}I\oplus K1)\oplus K2$ and $S_{nom}Q=S_{out}Q=$ $(S_{nom}Q \oplus K1) \oplus K2$. Using the associative property of the XOR function (i.e. $(A \oplus B) \oplus C = A \oplus (B \oplus C)$) and its self-inverse property (i.e. $A \oplus A = 0$), we get that $S_{out}I = S_{nom}I$ and $S_{out}Q = S_{nom}Q$ only when $K1 = K2$, i.e. when the first cryptographic key K1 and the second cryptographic key K2 are a same cryptographic key.

In some embodiments wherein the first cryptographic key K1 and the second cryptographic key K2 are a same cryptographic key, other processing than XOR functions can be executed in steps S210 and S220 as long as the corresponding encrypting and the decrypting are configured such that the second sequence of data comprises the initial sequence of data, e.g. when the encrypting and the decrypting compensate each other.

In some implementation, a different value of the cryptographic keys K1 and K2 is used on the I path and on the Q path. In such cases, the cryptographic keys K1 and K2 can be considered as complex valued, as discussed above, and the relationship $K1 = K2$ can be read $K1\_I = K2\_I$ for the I path and $K1\_Q = K2\_Q$ for the Q path.

In the embodiment of FIG. 2C, the step S210 implements the execution of an XOR logical function between binary elements of the initial sequence of data and of the first cryptographic key K1.

However, the step S220 of the embodiment of FIG. 2C differs from the embodiment of FIG. 2B in that the decryption of the first sequence of data (i.e. $S_{faulty}I$ for the I path and $S_{faulty}Q$ for the Q path) uses a decryption sequence (DSI for the I path and DSQ for the Q path) obtained as an output of a nonlinear function $f(.)$ taking as arguments the second cryptographic key K2 and the second sequence of data (i.e. $S_{out}I$ for the I path and $S_{out}Q$ for the Q path). Indeed, the use of such decryption sequence in place of using directly the second cryptographic key K2 for decrypting the first sequence of data prevents the possibility to perform attacks like KPA by acting on the cryptographic key provided (e.g. downloaded) to the IC through inspection of the resulting output second sequence of data, as discussed in more detail below.

Back to FIG. 2C, based on such decryption sequence, the step S220 comprises the execution of an XOR logical function between binary elements of the first sequence of data and of the decryption sequence, i.e. we get that $S_{out}I = S_{faulty}I \oplus DSI$ and $S_{out}Q = S_{faulty}Q \oplus DSQ$, with $DSI = f(S_{out}I, K2)$ and $DSQ = f(S_{out}Q, K2)$, wherein it is assumed for the sake of clarity that the second cryptographic key K2 has a same value for the I and Q paths, i.e. that $K2\_I = K2\_Q = K2$.

For instance, the nonlinear function $f(.)$ implements:
an XOR logical function between binary elements of the second cryptographic key K2 and of the second sequence of data, delivering an intermediate sequence; and
a nonlinear operation on the intermediate sequence, delivering the decryption sequence. Such nonlinear operation can be e.g. a circular permutation, a random shuffling or a byte substitution of the binary elements of the intermediate sequence.

In such implementations, in order to get $S_{out}I = S_{nom}I$ and $S_{out}Q = S_{nom}Q$, we need to have $S_{nom}I = S_{out}I = (S_{nom}I \oplus K1) \oplus DSI$ and $S_{nom}Q = S_{out}Q = (S_{nom}Q \oplus K1) \oplus DSQ$, with $DSI = f(S_{out}I, K2)$ and $DSQ = f(S_{out}Q, K2)$. Using the associative property of the XOR function (i.e. $(A \oplus B) \oplus C = A \oplus (B \oplus C)$) and its self-inverse property (i.e. $A \oplus A = 0$), we get that $S_{out}I = S_{nom}I$ and $S_{out}Q = S_{nom}Q$ only when $K1\_I = f(S_{nom}I, K2)$ for the I path and $K1\_Q = f(S_{nom}Q, K2)$ for the Q path.

However, due to implementation constraints, delays may be introduced in the calculation of the nonlinear function $f(.)$ and more generally in the feedback loop from the $S_{out}I$ and $S_{out}Q$ signals up to the decryption sequences DSI, DSQ. Assuming that such delay corresponds to a duration of N binary elements, N being an integer greater than or equal to one, of the considered sequences of data, we get that a current element of index n of the decryption sequence is such that $DSI(n) = f(S_{out}I(n-N), K2(n))$ and $DSQ(n) = f(S_{out}Q(n-N), K2(n))$. It results that $S_{out}I(n) = S_{nom}I(n)$ and $S_{out}Q(n) = S_{nom}Q(n)$ only when $K1\_I(n) = f(S_{nom}I(n-N), K2(n))$ for the I path and $K1\_Q(n) = f(S_{nom}Q(n-N), K2(n))$ for the Q path.

However, whatever the implementations constraints, we get that the first cryptographic key K1 corresponds to an output of the nonlinear function $f(.)$, as defined above, when taking as arguments the second cryptographic key K2 and the initial sequence of data $S_{nom}I$, $S_{nom}Q$.

In some implementations, a second cryptographic key K2 with different values for the real part, K2_I, and for the imaginary part, K2_Q, can be used for generating the decryption sequence for the I path and for the Q path respectively.

As highlighted previously, the use of such nonlinear function $f(.)$ taking as arguments the second cryptographic key K2 and the second sequence of data (i.e. $S_{out}I$ for the I path and $S_{out}Q$ for the Q path) allows preventing attacks like KPA. Indeed, the KPA attack works as follows. For the sake of clarity and without loss of generality, we consider the I path and we also consider as above that the first cryptographic key K1 has the same value for the I and Q paths and that the second cryptographic key K2 also has the same value for the I and Q paths. In the embodiment of FIG. 2B (i.e. without using the nonlinear function $f(.)$), when trying to determine the cryptographic keys, the attacker applies a trial key Ktr as the input of the cryptographic key provided to the IC, e.g. at the input of the first cryptographic key K1. In other words, we get $K1 = Ktr$ in this case. Then, $S_{out}I = (S_{nom}I \oplus Ktr) \oplus K2$. Using the associative and self-inverse properties of the XOR function, the attacker can extract the second cryptographic key K2 from $K2 = (S_{nom}I \oplus Ktr) \oplus S_{out}I$ provided that $S_{nom}I$ is known (e.g. the plaintext) and that $S_{out}I$ can be accurately measured or simulated. Then, the attacker finds the first cryptographic key K1 by setting $K1 = K2$.

Conversely, in the embodiment of FIG. 2C, the equation describing the operation now becomes $S_{out}I = (S_{nom}I \oplus K1) \oplus f(S_{out}I, K2)$. However, an attacker does not know neither $f$ nor K2, and since these two unknowns are perplexed in equation $S_{out}I = (S_{nom}I \oplus K1) \oplus f(S_{out}I, K2)$, the KPA cannot be employed for extracting both the unknown $f$ and K2 simultaneously.

However, during the design of the IC, such relationship between the first cryptographic key K1, the second cryptographic key K2, the nonlinear function $f(.)$ and the sequence of data, can be used by the designer of the IC for determining the cryptographic keys K1, K2 to be used when a given nonlinear function $f(.)$ has been chosen for implementation.

The invention claimed is:
1. A method for generating at least one communication frame to be transmitted by a telecommunication transmitter:
receiving, by an electronic device from a user, one of a first cryptographic key and a second cryptographic key and storing the one of the first cryptographic key and the second cryptographic key in a memory of the electronic device;

obtaining, by the electronic device, the first cryptographic key and the second cryptographic key, wherein the obtaining comprises reading the one of the first cryptographic key and the second cryptographic key from the memory, wherein another one of the first cryptographic key and the second cryptographic key is hardwired in an Integrated Circuit (IC) implementing the electronic device;

encrypting, by the electronic device, using the first cryptographic key, an initial sequence of data to be transmitted through the at least one communication frame, the encrypting delivering a first sequence of data, wherein the initial sequence of data comprises all or part of a predetermined preamble sequence of the at least one communication frame;

decrypting, by the electronic device, using the second cryptographic key, the first sequence of data, the decrypting delivering a second sequence of data; and generating, by the electronic device, the at least one communication frame based on the second sequence of data, wherein the encrypting and the decrypting are configured such that the second sequence of data comprises the initial sequence of data only when a predetermined relationship holds between the first cryptographic key and the second cryptographic key.

2. The method according to claim 1, wherein the predetermined relationship corresponds to having the first cryptographic key and the second cryptographic key being a same cryptographic key.

3. The method according to claim 2, wherein:
the encrypting implements an XOR logical function between binary elements of the initial sequence of data and of the first cryptographic key; and
the decrypting implements an XOR logical function between binary elements of the first sequence of data and of the second cryptographic key.

4. The method according to claim 1, wherein the decrypting the first sequence of data comprises:
determining a decryption sequence as an output of a nonlinear function taking as arguments the second cryptographic key and the second sequence of data,
and wherein the decrypting the first sequence of data uses the decryption sequence.

5. The method according to claim 4, wherein the nonlinear function implements:
an XOR logical function between binary elements of the second cryptographic key and of the second sequence of data, delivering an intermediate sequence; and
a nonlinear operation on the intermediate sequence, delivering said decryption sequence.

6. The method according to claim 5, wherein:
the encrypting implements an XOR logical function between binary elements of the initial sequence of data and of the first cryptographic key; and
the decrypting implements an XOR logical function between binary elements of the first sequence of data and the decryption sequence.

7. The method according to claim 6, wherein the predetermined relationship corresponds to having the first cryptographic key based on an output of the nonlinear function when taking as arguments the second cryptographic key and the initial sequence of data.

8. The method according to claim 4, wherein:
the encrypting implements an XOR logical function between binary elements of the initial sequence of data and of the first cryptographic key; and the decrypting implements an XOR logical function between binary elements of the first sequence of data and the decryption sequence.

9. A non-transitory computer-readable medium carrier comprising program code instructions stored thereon for causing an electronic device to perform:
receiving one of a first cryptographic key and a second cryptographic key and storing the one of the first cryptographic key and the second cryptographic key in a memory of the electronic device;
obtaining the first cryptographic key and the second cryptographic key, wherein the obtaining comprises reading the one of the first cryptographic key and the second cryptographic key from the memory, wherein another one of the first cryptographic key and the second cryptographic key is hardwired in an Integrated Circuit (IC) implementing the electronic device;
encrypting, using the first cryptographic key, an initial sequence of data to be transmitted through the at least one communication frame, the encrypting delivering a first sequence of data, wherein the initial sequence of data comprises all or part of a predetermined preamble sequence of the at least one communication frame;
decrypting, using the second cryptographic key, the first sequence of data, the decrypting delivering a second sequence of data; and
generating the at least one communication frame based on the second sequence of data,
wherein the encrypting and the decrypting are configured such that the second sequence of data comprises the initial sequence of data only when a predetermined relationship holds between the first cryptographic key and the second cryptographic key.

10. An electronic device for generating at least one communication frame to be transmitted by a telecommunication transmitter, the electronic device comprising a processor or a dedicated computing machine configured for:
receiving, by an electronic device from a user, one of a first cryptographic key and a second cryptographic key and storing the one of a first cryptographic key and a second cryptographic key in a memory of the electronic device;
obtaining the first cryptographic key and the second cryptographic key, wherein the obtaining comprises reading the one of the first cryptographic key and the second cryptographic key from the memory, wherein another one of the first cryptographic key and the second cryptographic key is hardwired in an Integrated Circuit (IC) implementing the electronic device;
encrypting, using the first cryptographic key, an initial sequence of data to be transmitted through the at least one communication frame, the encrypting delivering a first sequence of data, wherein the initial sequence of data comprises all or part of a predetermined preamble sequence of the at least one communication frame;
decrypting, using the second cryptographic key, the first sequence of data, the decrypting delivering a second sequence of data; and
generating the at least one communication frame based on the second-sequence of data,
wherein the encrypting and the decrypting are configured such that the second sequence of data comprises the initial sequence of data only when a predetermined relationship holds between the first cryptographic key and the second cryptographic key.

* * * * *